United States Patent [19]

Johnson

[11] 4,166,513

[45] Sep. 4, 1979

[54] SAFETY-BRAKE CONTROL SYSTEM FOR VEHICLES

[76] Inventor: Buford D. Johnson, Rte. #3 - 3551 Black Hwy., Adrian, Mich. 49221

[21] Appl. No.: 887,183

[22] Filed: Mar. 16, 1978

[51] Int. Cl.² .............................................. B60T 7/12
[52] U.S. Cl. .................................... 180/271; 303/6.1; 303/19; 303/71; 91/453; 180/285
[58] Field of Search ............................. 303/71, 6.1, 19; 188/109; 91/453; 180/82 B, 111, 112

[56] References Cited

U.S. PATENT DOCUMENTS

| | | | |
|---|---|---|---|
| 3,487,451 | 12/1969 | Fontaine | 303/19 |
| 3,790,223 | 2/1974 | Fontaine | 303/19 |
| 3,885,823 | 5/1975 | Lee | 291/38 |

Primary Examiner—Trygve M. Blix
Assistant Examiner—Reinhard J. Eisenzopf
Attorney, Agent, or Firm—Olsen and Stephenson

[57] ABSTRACT

A safety-brake control system for a vehicle for the automatic actuation of the parking-brake valve to the brake-applied position comprising a lever arm connected at one end to the actuator of the valve and at the other end to a flexible connector element which in turn is connected to the moving arm of a solenoid. Energization of the solenoid pulls the flexible connector element to move the lever arm to actuate the valve to the brake-applied position. The valve thereafter can be actuated to the brake-released position by manual movement of the valve actuator.

10 Claims, 3 Drawing Figures

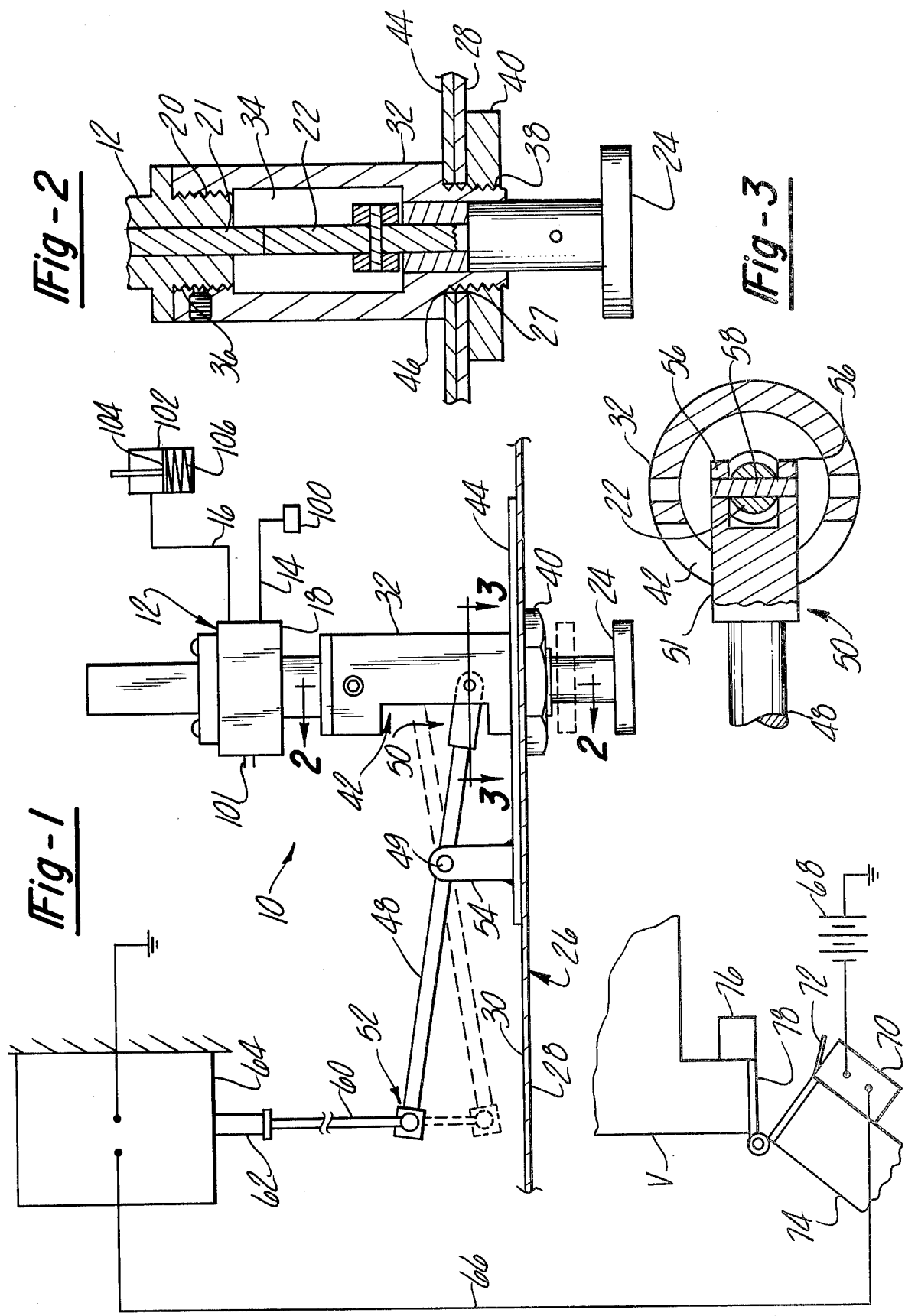

SAFETY-BRAKE CONTROL SYSTEM FOR VEHICLES

BACKGROUND OF THE INVENTION

The present invention relates generally to brake-controlling devices used for such vehicles as trucks, and more particularly, to a safety-brake control system for automatically actuating the parking-brake valve in response to a predetermined operator movement.

Most motorized land vehicles have brake systems which are fluid operated, either by air or liquid, and which are normally controlled by a foot pedal. Usually, the vehicle is also equipped with a hand-operated parking brake valve which, as a desirable safety practice, should be actuated to set the parking brake whenever the operator leaves the vehicle. There are many times, however, when the operator forgets to effect the setting of the parking brake. The consequences of this inadvertence can be costly in damaged property and more importantly, tragic, if a person is injured should the vehicle move uncontrollably in the absence of the operator.

Automatic brake-setting systems have been developed and for the most part, adequately fulfill the objectives for which they are designed. These prior art systems, however, are relatively expensive and require that substantial modifications be made to the original equipment of the vehicle to accommodate their installation. In fact, many automatic brake setting systems can only be installed on vehicles as original equipment.

Many vehicles, however, have been manufactured without automatic parking-brake system, but with manually actuatable parking-brake systems. There is a need, therefore, for a low-cost, effective safety-brake control system which can be easily incorporated into a conventional parking-brake system on a land vehicle.

It is the general object of the present invention, therefore, to provide an improved safety-brake control system for automatically actuating the parking brakes in response to a specific operator action.

SUMMARY OF THE INVENTION

In accordance with the present invention, a safety-brake system is provided for automatically setting the parking brakes in response to a specific operator action such as opening the door of the vehicle or vacating the driver's seat. The vehicle, whether it is a truck, a bus, or the like, generally has a parking-brake valve which is conveniently located on the control panel, for example, and which is manually actuated between a brake-applied position and a brake-released position. The valve has an actuator including a knob or handle mounted on a valve stem that extends into the valve body. Some valves are constructed so that when the handle is pushed in, the valve is actuated to the brake-released position and when the handle is pulled out, the valve is actuated to the brake-applied position; other valves are constructed for operation in the opposite manner.

A lever arm is pivotally mounted between its ends at a location near the valve with one end pivotally connected to the valve stem or a valve stem extension affixed to the valve stem of the parking-brake valve. The other end of the lever arm is connected through a flexible connector element such as a metallic cable to the moving arm of a solenoid that is located in the engine compartment or other suitable location behind the control panel.

The solenoid is energized by the closing of a switch which, for instance, can be located on the door frame on the driver's side of the vehicle. The switch is maintained in the open condition while the door is closed and is closed to energize the solenoid when the door is opened. Thus, should the operator open the vehicle's door without setting the parking brake, the safety-brake control system of this invention would in response to this action automatically set the parking brake. The energization of the solenoid pulls the cable taut so as to pivot the lever arm to actuate the valve to the brake-applied position. When the door is closed, the switch opens, de-energizing the solenoid so that the cable becomes slack. The valve can now be actuated to the brake-released position by manually moving the valve actuator.

For vehicles equipped with a conventional parking-brake valve, an adapter sleeve is mounted on the threaded mounting portion on the valve's body. The lever arm is pivotally connected to a valve stem extension which is connected to the valve's original actuator stem. The adapter sleeve has an opening in its side wall through which the lever arm extends to enable its connection to the valve stem extension. The sleeve has a threaded portion which extends through the control panel and on which a threaded jam nut is mounted to support the adapter sleeve and the valve body on the control panel. The lever arm is mounted on a plate which is interposed between the adapter sleeve and the control panel and is held in a fixed position when the sleeve is mounted on the control panel. This construction enables the unit to be disassembled merely by removing the jam nut thereby facilitating the removal of the valve and its related components.

Further objects, features, and advantages of the present invention will become apparent from a consideration of the following description when taken in connection with the appended claims and the following drawing in which:

FIG. 1 is a diagrammatic illustration of the safety-brake control system of the present invention for actuating a brake valve mounted on the control panel of a vehicle;

FIG. 2 is a sectional view of an adapter sleeve, taken substantially from line 2—2 in FIG. 1; and FIG. 3 is a section view of the adapter sleeve taken substantially from line 3—3 in FIG. 1.

DESCRIPTION OF THE PREFERRED EMBODIMENT

Referring to the drawing, the safety-brake system of the present invention, indicated generally at 10 in FIG. 1, operates to automatically set the parking brake of a vehicle such as a truck, bus, or the like when a specific operator action is performed. The operator action is preferably one that is performed automatically and provides a good indication that the operator is leaving the vehicle, such as when the driver's seat is vacated or when the door on the driver's side is opened. Consequently, the parking brakes will be set even though the operator fails to manually set the parking brake. The safety-brake system 10 is operatively associated with fluid valve means in the form of a parking-brake valve 12.

In the embodiment illustrated in FIG. 1, the valve 12 controls the brakes which are spring operated to the brake-applied position by the release of air pressure. The valve 12 receives air pressure through line 14 from a suitable air supply 100 and is connected to a brake unit 102 by the line 16. The brake unit 102 comprises a piston 104 that is urged outwardly to a brake-applied position from the unit 102 by a spring 106 that is positioned behind the piston 104. Accordingly, when air pressure is supplied by line 16 to the front of the piston 104, the piston 104 is urged rearwardly against the force of the spring 106 to the brake-released position to release the parking brake. The piston 104 is suitable connected to the brakes (not shown) to set and release the brakes in response to actuation of the valve 12.

The valve 12 includes a valve body 18 having an externally-threaded mounting portion 20 (FIG. 2) and actuator means in the form of a valve stem 21, a valve stem extension 22, and a handle or knob 24 that is connected to the valve stem extension 22 in any suitable manner such as by welding, for example. The valve 12 is mounted on and extends through an opening 27 in the vehicle's control panel 26 which has a front side 28 facing the operator and a back side 30.

The valve 12 is actuatable between a brake-applied position when the handle 24 is pulled away from the valve body 18 as shown in dark lines in FIG. 1 wherein air pressure is released from the unit 102 by an exhaust 101 in the valve 12 and a brake-released position in which the handle 24 is pushed toward the valve body 18 as shown in broken lines in FIG. 1 wherein air pressure is supplied via line 16 to the unit 102. The valve 12 is normally manually operated to set and release the parking brake.

An annular adapter sleeve 32, having an axial passageway 34 through which the valve stem 21 and the valve stem extension 22 extend, is mounted on the threaded mounting portion 20 of the valve body 18. The sleeve 32 has internal threads 36 at one end which enables the threadable mounting of the sleeve 32 on the valve body 18. The other end of the adapter sleeve 32 has an externally-threaded mounting portion 38 which extends through the control panel 26. A jam nut 40 is threadably mounted on the sleeve portion 38 to secure the sleeve 32 and the valve 12 on the control panel 26.

The annular sleeve 32 has an opening 42 that is formed through its side wall and which is located between the ends of the sleeve 32. The opening 42 enables access to be gained to the valve stem extension 22 when the sleeve 32 and valve 12 are mounted on the control panel 26.

A plate member 44 having an opening 46 is disposed on the back of the control panel 26 so that the opening 46 is aligned with the opening 27 and is interposed between the control panel 26 and the sleeve 32 so that it can be secured in place by tightening the jam nut on the sleeve 32. A lever arm 48 is pivotally mounted at 49 between its ends 50 and 52 on a stand structure 54 that is mounted on the plate 44. The distance between the pivot point 49 and the end 50 of the lever arm 48 is less than the distance between the pivot point 49 and the end 52 to provide a mechanical advantage in pivotting the lever arm 48.

The lever arm 48 extends through the access opening 42 in the sleeve 32 and is pivotally connected to the valve stem extension 22. As seen in FIG. 3, the end 50 of the lever arm 48 has a clevis or U-shaped construction 51 in which spaced-apart legs 56 straddle the valve stem extension 22. A pin 58 extends between the legs 56 and through the valve stem extension 22 to pivotally connect the lever arm 48 to the valve stem extension 22.

The other end 52 of the lever arm 48 is connected through a flexible connector element such as a cable 60 to the moving arm 62 of a solenoid 64. The cable 60 enables the solenoid 62 to be located at a remote location such as in the engine compartment since rollers or the like can be readily implemented to avoid any obstructions. Moreover, the cable 60 is effective to move the lever arm 48 in only one direction; that is, the cable can only pull the lever arm 48, thus ensuring that the operator will have to manually actuate the valve 12 to the brake-released position. The solenoid 64 is connected in a circuit 66 to the vehicle's battery 68. The circuit 66 includes a switch 70 that has a spring-operated actuator 72 and that is mounted on the door 74 of the vehicle V. The switch 70 is opened when the door 74 is closed by the closing movement of the actuator 72 toward the switch 70 when the actuator 72 engages a block 76 mounted on the door frame 78. When the door 74 is opened, the switch 70 is closed as the spring in the switch 70 causes the actuator 72 to be moved away from the switch 70 thereby energizing the solenoid 64.

In operation, assume that the valve 12 is in the brake-released position with the handle 24 and the lever arm 48 in the positions illustrated in broken lines in FIG. 1. In this position, air pressure is being supplied through the line 16 to the brake unit 102. Normally, the operator would pull the handle 24 away from the valve 12 to actuate it to the brake-applied position to set the barking brake, in which case, the air pressure in the unit 102 is exhausted through the exhaust 101 so that the spring 106 can urge the piston 104 outwardly to apply the brakes. In the event the operator forgets to manually actuate the valve 12 to the brake-applied position, the safety-brake control system 10 will automatically activate the valve 12 when the operator opens the door 74.

Opening the door 74 causes the switch 70 to close as the actuator 72 breaks contact with the block 76. Power from the battery 68 is applied through the circuit 66 to the solenoid 64. Energization of the solenoid 64 causes the moving arm 62 to be pulled into the solenoid 64 thereby pulling the cable 60 causing it to pivot the lever arm 48 clockwise as viewed in FIG. 1 from its broken-line position to its solid-line position. Pivotting of the arm 48 moves the valve stem extension 22 and handle 24 outwardly to the brake-applied position causing the parking brake to be automatically set as the air pressure from the braking unit 102 is exhausted through the exhaust 101. When the door 74 is closed, the solenoid 64 is de-energized and the cable 60 becomes slack. The valve 12, however, remains in the brake-applied position even though the solenoid 64 is de-energized. The valve 12 is subsequently actuated to the brake-released position while the door 74 is closed by manually pushing in the handle 24.

It can be appreaciated that the switch 74 can be operatively associated with the operator's seat so that the solenoid 64 is energized when the operator vacates the driver'seat. The illustrated arrangement, wherein the mounting plate 44 is removably mounted on the back side 30 of the control panel 26 by means of the adapter sleeve 32 and the jam nut 40, facilitates the disassembly of the safety-brake control system 10 in the event servicing is needed or parts are to be replaced. Merely removing the jam nut 40 and withdrawing the sleeve 32 from the control panel 26 releases the mounting plate 44 from the control panel 26. If, for example, the mounting plate 26 was permanently affixed to the control panel 26, the lever arm 48 would have to be removed from its connection 49 or the lever arm 48 would have to be disconnected from the valve stem extension 22 before the valve 12 could be removed, a task that would be fraught with difficulties.

From the above description, it can be seen that an improved safety-brake control system 10 is provided which is readily incorporated into vehicles having a hand-operated, parking-brake valve. Movement of the lever arm 48 by the solenoid 64 to actuate the valve 12 to the brake-applied position when the switch 70 is closed insures that the parking brakes are set whenever the operator leaves the vehicle. The safety-brake control system is effective and needs only inexpensive components which are easily assembled and mounted for operation.

What is claimed is:

1. A safety-brake control system for a motor vehicle having brakes and a source of electrical power, said safety-brake system comprising valve means and operator-movable actuator means for actuating said valve means between a brake-applied position and a brake-released position, electrical control means operatively associated with said actuator means and operable to move said actuator means to actuate said valve means to the brake-applied position, circuit means including switch means connecting said power source to said electrical control means, said electrical control means being selectively operable to move said actuator means to actuate said valve means to the brake-applied position in response to operation of said switch means, actuation of said valve means to the brake-released position being achieved only by operator movement of said actuator means.

2. A brake control system according to claim 1 further including a lever arm pivotally mounted between its ends at a location speed apart from said valve means, means connecting one end of said lever arm to said actuator means, means connecting the other end of said lever arm to said electrical control means so that said lever arm is operable in response to movement thereof to operate said actuator means between a brake-applied position and a brake-released position.

3. A brake control system according to claim 2 wherein said means connecting the other end of said lever arm to said electrical control means comprises a flexible connector element operable when placed in tension to pivot said lever arm so as to actuate said valve means to the brake-applied position.

4. A brake control system according to claim 3 wherein said electrical control means comprises a solenoid having a moving arm connected to said flexible connector element, said solenoid being energized in response to a closing of said switch means to pull said flexible connector element taut to thereby pivot said lever arm to actuate said valve means to the brake-applied position.

5. A brake control system according to claim 4 wherein said actuator means includes handle means and valve stem means connecting said handle means with said valve means, said one end of said lever arm being connected to said valve stem means.

6. A brake control system according to claim 5 wherein the distance between said one end of said lever arm and the location at which said lever arm is pivotally mounted is less than the distance between said other end of said lever arm and said location at which said lever arm is pivotally mounted.

7. In a motor vehicle having a control panel with front and back sides, valve means on said control panel actuatable between a brake-applied position and a brake-released position, said valve means including a valve body disposed on the back side of the control panel and handle means disposed on the front side of the control panel, valve stem means connecting said handle means with said valve body, the improvement comprising a safety-brake control system for actuating said valve means to the brake-applied position comprising a plate member removably mounted on the back side of the control panel, a lever arm pivotally mounted intermediate its ends on said plate member, an annular sleeve member interposed between said valve body and said control panel, said annular sleeve member surrounding said valve stem means and having a laterally-facing access opening, one end of said lever arm extending through said access opening and being connected to said valve stem means, a solenoid having a moving arm and being located at a position spaced from said lever arm, flexible connector means connecting said solenoid moving arm with the other end of said lever arm, circuit means including a source of electrical power and switch means for selectively connecting said power source to said solenoid, said solenoid being energized in response to a closing of said switch means to pull taut said flexible connector means to pivot said lever arm to actuate said valve means to the brake-applied position.

8. A safety-control system according to claim 7 wherein said valve body includes an externally-threaded mounting portion, said annular sleeve having an internally-threaded portion at one end thereof to enable the threadable mounting of said sleeve on said valve body-mounting portion, the other end of said sleeve having an externally-threaded mounting portion extending through said control panel, and threaded fastening means mounted on the external threaded portion of said sleeve on the front side of said control panel to secure said sleeve and valve body to said control panel.

9. A safety-control system according to claim 8 wherein said plate member is interposed between said control panel and said sleeve so as to be secured in a fixed position by said fastening means and said sleeve.

10. A safety-brake control system according to claim 9 wherein said one end of said lever arm has a U-shaped structure including spaced-apart leg portions straddling said valve stem means, and pin means pivotally connecting said leg portions with said valve stem means.

* * * * *